United States Patent [19]
Dennys

[11] Patent Number: 5,222,744
[45] Date of Patent: Jun. 29, 1993

[54] SEALING GASKET, ESPECIALLY FOR A FLANGED COUPLING

[75] Inventor: Jean-Pierre Dennys, Neuilly sur Seine, France

[73] Assignee: Societe Industrielle d'Equipment Mecanique - Supranite, Paris, France

[21] Appl. No.: 824,315

[22] Filed: Jan. 23, 1992

[30] Foreign Application Priority Data

Jan. 23, 1991 [FR] France ............... 91 00730

[51] Int. Cl.$^5$ ............................................. F16J 15/32
[52] U.S. Cl. ................................... 277/180; 277/105; 277/198; 277/235 B
[58] Field of Search ............. 277/180, 168, 179, 190, 277/198, 235 B, 102, 105, 188 A, 207 A, 227, 235 R; 285/910, 351

[56] References Cited

U.S. PATENT DOCUMENTS

| | | | |
|---|---|---|---|
| 2,856,249 | 10/1958 | Leman | 277/79 |
| 3,163,431 | 12/1964 | Tanner | 277/206 R |
| 3,171,662 | 3/1965 | Warn et al. | 277/211 |
| 3,841,289 | 10/1974 | Meyers | 277/235 B |
| 4,519,619 | 5/1985 | Doyle | 277/235 B |
| 4,531,749 | 7/1985 | Jackson | 277/180 |

Primary Examiner—William A. Cuchlinski, Jr.
Assistant Examiner—Daniel G. DePumpo
Attorney, Agent, or Firm—Jacobson, Price, Holman & Stern

[57] ABSTRACT

A sealing gasket to be clamped in particular between pipe-coupling flanges comprises a sealing packing of expanded graphite placed between an inner reinforcement ring and an outer reinforcement ring, the two rings being placed at different levels prior to clamping. The graphite packing is applied against bearing surfaces formed and oriented on the reinforcement rings so that, at the time of clamping of the gasket, the resultants of the forces transmitted to the bearing surfaces are in the same direction and of opposite sense, thus inducing a compression of the sealing packing.

8 Claims, 3 Drawing Sheets

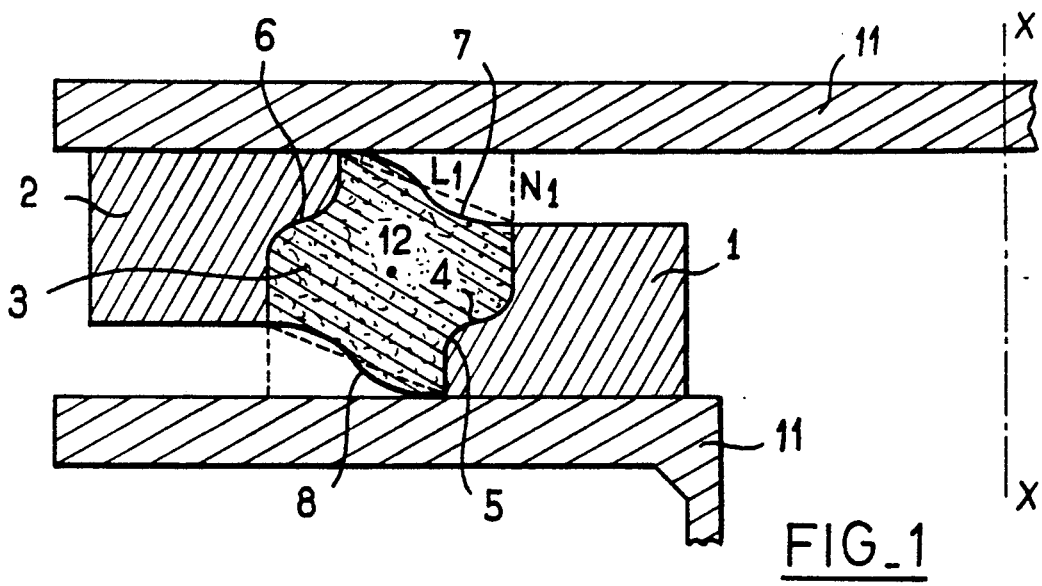
FIG_1
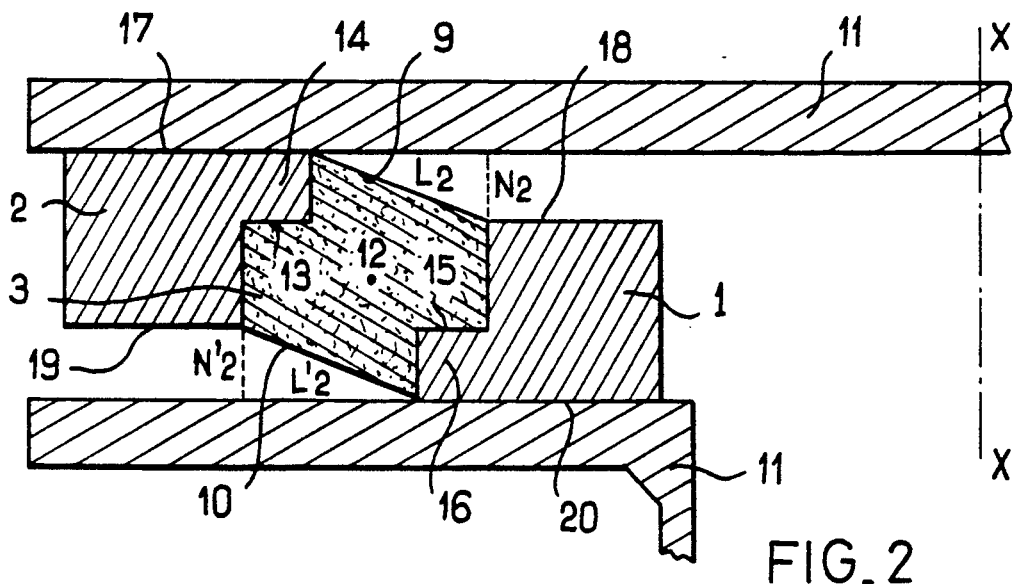
FIG_2
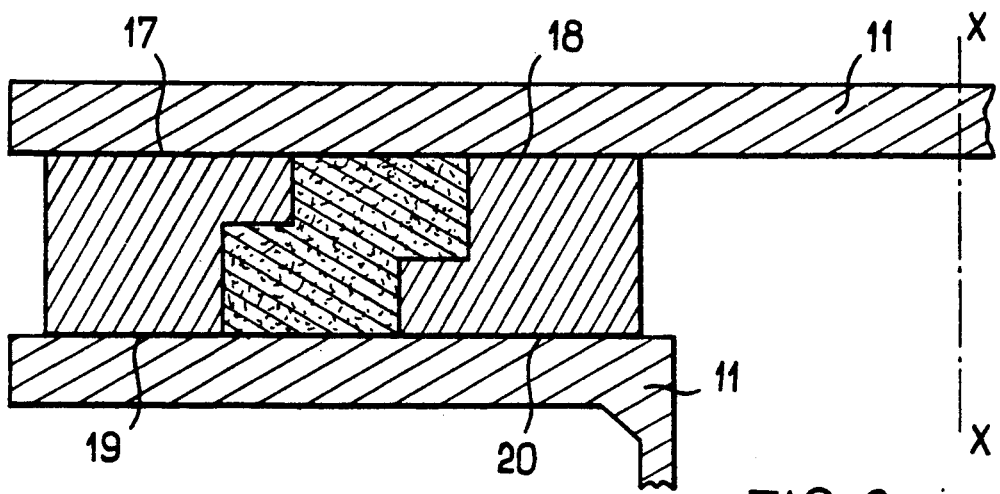
FIG_3

1

SEALING GASKET, ESPECIALLY FOR A FLANGED COUPLING

BACKGROUND OF THE INVENTION

1. Field of the Invention

The present invention relates to a sealing gasket, especially for a flanged coupling.

2. Description of the Prior Art

In order to ensure leak-tightness of pipe-couplings, for example, in which thermal shock is liable to arise, expanded graphite is being put to increasingly widespread use and is progressively being substituted for asbestos both for economical, industrial and health reasons.

Patent No. FR-A-2 517 789 relates to a sealing gasket having an annular metallic core provided on each of its opposite faces with at least one circular groove or recess which is spaced at a distance from its central orifice and in which is placed a packing of expanded graphite. The packing projects above the metallic core so that, after clamping by means of suitable flanges, the expanded graphite is flush with the metallic core.

In some cases, the metallic core is formed by an inner ring and an outer ring, the opposite ring faces being cut in such a manner as to form in each case a V-section groove which is flared outwards.

One of the disadvantages lies in the absence of any stable metallic connection between the pipe-coupling flanges and each of the outer and inner rings owing to the fact that the flanges are in contact with the core of expanded graphite.

While the metallic rings are being brought together by clamping, that portion of the graphite which projects with respect to the rings is flattened by compression and induces within the graphite a nonuniform pressure field which tends to deform the inner ring in an unpredictable manner, to move it away from the outer ring and to enlarge this latter, these movements being neither prevented nor limited by any external obstacle.

By reason of the fact that the spacing between the two metallic rings increases during the clamping operation, there accordingly results a reduction in density of the expanded graphite core located between said rings. However, a reduction in density has an adverse effect on the sealing gasket while it is in use.

Patent No. FR-A-2 573 837 relates to a ring-shaped gasket having an annular core of molded expanded graphite between an inner metallic ring and an outer metallic ring, each ring being capable of acting as a spring in a direction parallel to the axis of revolution of the gasket. These rings can be formed in a number of turns wound in a tight spiral.

At the time of clamping of the gasket, the wavy surfaces of the walls become deformed and permit compression of the graphite core, with the result that the top and bottom faces of the core are at the same level as the metallic rings both before and after clamping of the gasket.

One of the drawbacks of a gasket of this type is irregular damping of the elastic recovery characteristics of the gasket as a result of friction between adjacent turns. This has a detrimental effect on the regeneration of contact pressures between the graphite and the coupling flanges during pressure and temperature changes.

Another disadvantage is the confinement of air and moisture between the metallic turns which tends to cause corrosion.

A further disadvantage lies in the fact that, as in the case mentioned earlier, it proves impossible to re-use a pair of metallic rings (usually the most costly part of the gasket). The user himself is quite unable to replace a graphite core which may have sustained damage during assembly on account of its fragility and which may not have suitable physical parameters, weight and density in compliance with the state of the joint or connection in which the gasket is intended to be employed.

Patent No. FR 86 10 121 relates to a gasket comprising at least one pair of annular metallic sheaths surrounding one sealing face of the gasket. The two annular metallic sheathing elements, namely the inner and outer elements, each have a cross-section in the form of an angle-iron member placed at one corner of the gasket. Each element has an annular cylindrical portion, the external surface of which forms a portion of the lateral surface of the gasket and has a height ranging in value from 25 to 50% of the thickness of the gasket, and an annular transverse portion, the external surface of which is inclined at each point of its transverse cross-sections at an angle of 90° to 120° with respect to the longitudinal direction of its annular cylindrical portion and surrounds said sealing face, the width of said portion being within the range of 10 to 45% of the width of the gasket.

This device is subject to the disadvantage of increasing the number of non-leaktight paths which are in communication with the fluid and of forming opposite to each other and at a short distance paths which are ready to evacuate leakages originating from the first paths.

As in the document cited earlier, zones between the confined metallic surfaces which are conducive to corrosion are formed.

The object of the present invention is to overcome the disadvantages mentioned earlier and to propose a sealing gasket having practical performances which are more effectively controlled, in particular in the presence of assemblies having large diameters and designed for high pressures.

SUMMARY OF THE INVENTION

The sealing gasket in accordance with the invention is of the type comprising two reinforcement rings consisting of an inner ring and an outer ring, a sealing gasket of expanded graphite, said gasket being intended to be clamped between pipe-coupling flanges. In accordance with a distinctive feature of the invention, the two reinforcement rings are placed at different levels prior to clamping, the sealing packing being applied against contact surfaces which are formed and oriented on the reinforcement rings so that, at the time of clamping, the resultants of the forces transmitted to said contact surfaces are in the same direction but of opposite sense and induce a compression of the sealing packing.

One advantage thereby achieved is that the flanges act directly on the reinforcement rings and the force exerted on said rings is transmitted entirely to the packing which is thus compressed, the flanges and rings being in contact and prevented from moving laterally at the time of compression of the packing.

The friction forces thus produced stabilize each reinforcement ring in its position, in its shape and in its dimension.

In contrast to the other devices described, at least one of the reinforcement rings can readily be fixed on the flange by insertion to a small depth since each metallic ring remains applied against a flange from the outset of the clamping operation and can be centered and engaged therein prior to application of the clamping force and therefore without any danger of damage during the clamping operation.

Moreover, the gasket is less fragile since its graphite core no longer projects but is slightly set back on each face with respect to one of the metallic rings, thus permitting protection of the core during handling operations.

With a set of metallic rings which are often very costly, it is possible to store a number of separately packaged graphite cores. In addition, positioning of the cores does not entail the need for any press or any manufacturing equipment.

These graphite cores can constitute a range in which the dosage and densification of the graphite are suitable for a variety of assemblies of identical size but having mechanical characteristics which, in actual practice, are developed or have developed in different ways. Thus a temporary core of low-density graphite often makes it possible to obtain a sufficient degree of leak-tightness on a damaged assembly while awaiting repair work.

The arrangement and shape of the metallic rings in accordance with the present invention offers the additional advantage mentioned below.

The chamber provided for compression of the graphite is open at the beginning of clamping of the flanges only over a perimeter having a length divided by 2 with respect to patent No. FR-A-2 517 789, thus reducing at least by the same factor the risks of losses of graphite in weight, therefore in compression, and therefore in leak-tightness.

By means of the present invention, the graphite is put under pressure by central penetration of a projecting portion (knife-edge) which is more efficient and more reliable than flattening by surface compression based on the principle described earlier. This result is achieved for two reasons:

in the first place, the graphite is already in contact with the chamber walls when it is subjected to compression and the friction forces on these walls tend to hold it in position within the chamber whereas the same friction forces oppose the introduction of graphite into the chamber when the graphite layers subjected to pressure are the outer layers which project with respect to the chamber, as is the case in existing devices;

in the second place, the mode of compression by penetration produces zones which have a higher pressure within the graphite sections and have a tendency to supply the more critical zones with the pressure reserve formed by said higher-pressure zones whereas the method of compression by flattening employed in systems of the prior art has the reverse characteristic since the zones subjected to the lowest pressures have a tendency to attract the graphite which is located in the vicinity of the fluid to be sealed-off.

BRIEF DESCRIPTION OF THE DRAWINGS

FIG. 1 is a part-sectional view of the gasket according to a first embodiment of the invention, prior to clamping of the gasket.

FIG. 2 is a part-sectional view of another embodiment of the invention, prior to clamping of the gasket.

FIG. 3 is a sectional view which is identical with that of FIG. 2 but after clamping of the gasket.

DESCRIPTION OF THE PREFERRED EMBODIMENTS

Figure 4:
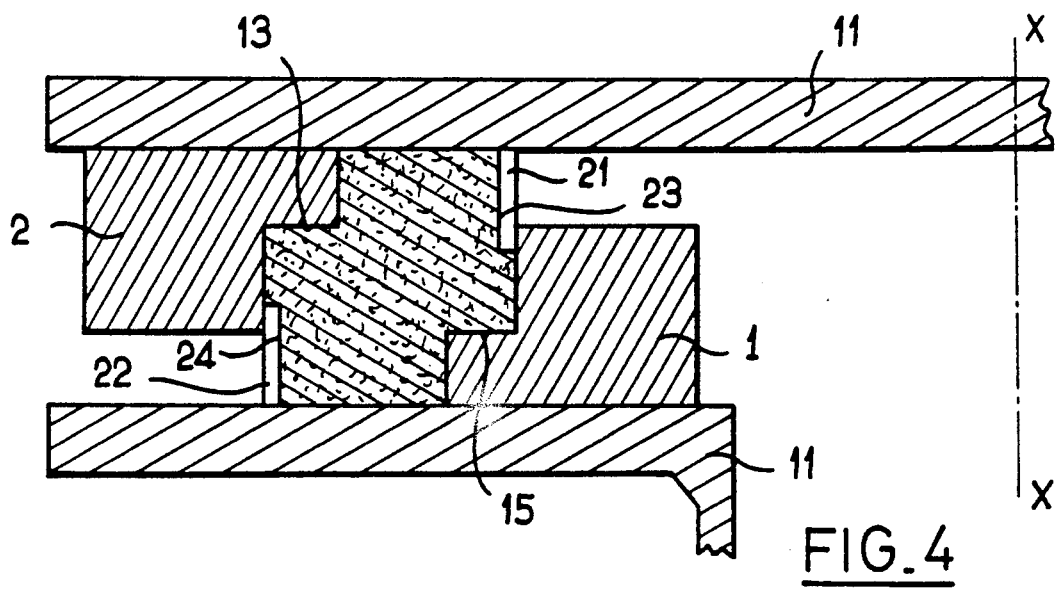
FIG. 4 is a part-sectional view of another embodiment of the invention, prior to clamping of the gasket.

The sealing gasket according to the invention comprises an inner ring 1, an outer ring 2 and an annular packing 3 of expanded graphite. These elements surround a space which is often of revolution about an axis X—X, which contains either the fluid or one of the fluids, or all the fluids to be sealed-off.

The inner ring 1 has a bearing zone 4 constituted in FIG. 1 by a rounded shoulder 5 formed on the lower portion for the annular packing 3. The outer ring also has a rounded bearing shoulder 6 which in this case is formed on the upper portion.

The packing 3 of expanded graphite which is placed between the inner ring 1 and the outer ring 2 has a shape in cross-section which corresponds to the shape illustrated in FIG. 1. In other words, the packing has rounded top and bottom faces 7 and 8 respectively as shown in FIG. 1 or inclined top and bottom faces 9 and 10 respectively as shown in FIG. 2. The angle of slope of the top and bottom faces of the packing 3 is smaller than or equal to the angle of repose (natural angle of slope) of the expanded graphite employed. The angle of repose is the maximum angle such that the forces exerted by coupling flanges 11 on the graphite particles during the clamping operation remain oriented towards the interior of the packing without causing any displacement of particles towards the contacting faces 17 to 20 of the metallic rings on the coupling flanges. It must in fact be ensured that decohesion of the graphite does not take place or in other words that the angle of slope is sufficiently small to prevent decohesion of the graphite.

In the case of FIG. 1, the inner and outer rings 1 and 2 respectively are located at different levels, the difference in level being equal to $N_1$. Since the width of the packing is $L_1$, the ratio $N_1/L_1$ is substantially equal to the slope of the top and bottom faces 7 and 8 respectively of the packing 3. As has been noted earlier, the cohesion of the graphite depends on the value of the ratio $N_1/L_1$.

Similarly, in the case of FIG. 2, the difference in level $N_2$ between the rings 1 and 2 and the width $L_2$ of the packing 3 serve to determine the ratio $N_2/L_2$ which is substantially equal to the angle of slope of the top and bottom faces 9 and 10 respectively of said packing 3.

The gasket shown in FIG. 2 has two bearing zones, one bearing zone being constituted by a downwardly oriented shoulder 13 formed on the upper end portion 14 of the outer ring 2 whilst the other bearing zone is constituted by an upwardly oriented shoulder 15 formed on the lower end portion 16 of the inner ring 1. The shoulders 13 and 15 can be symmetrical with respect to the center 12. Similarly, the half-section as a whole can have a symmetry with respect to the center 12 but does not have any symmetry with respect to an axis.

Prior to clamping, the constituent elements of the gasket of FIG. 2 occupy the positions illustrated. When the gasket is clamped between the flanges 11, a vertical force is therefore applied on the top face 17 of the outer ring 2 and on the bottom face 20 of the inner ring 1 or else simultaneously on said faces 17 and 20. The packing 3 is then compressed and the expanded graphite fills the bottom triangle $N'_2L'_2$-10 or the top triangle $N_2L_2$-9 or else both triangles so as to ensure that, after clamping, the top faces 17 and 18 of the rings 1 and 2 are practically located in the same plane, with due allowance for dimensional tolerances. The same applies to the bottom faces 19 and 20, the gasket being accordingly designed in the form illustrated in FIG. 3.

During the clamping operation, the two outer and inner reinforcement rings 1 and 2 respectively transmit part of the clamping effort or force of the flanges 11 to the packing 3 (FIG. 2) while affording resistance to the pressure developed by this force within the packing and while limiting the compression of the graphite. In fact, on account of the orientations of the bearing zones 13 and 15, the resultants of the forces generated within the packing 3 are located in the same direction but are oriented in two opposite directions.

It is observed that the cross-section occupied by the graphite is reduced in the case of FIGS. 2 and 3 by the area $N_2L_2$-9 or $N'_2L'_2$-10. In consequence, the volume occupied by the graphite is also reduced.

In order to ensure that the graphite can set up a resistance to the fluid to be sealed-off, the quantity and more specifically the weight of graphite trapped within the chamber defined by the outer and inner rings and the flanges must remain equal to a predetermined weight which is chosen as a function of the intended use of the sealing gasket according to the invention.

In an alternative embodiment of the gasket in accordance with the invention as illustrated in FIG. 4, two annular members 21 and 22 which are preferably metallic are placed on vertical faces or cylindrical walls 23, 24 of the sealing packing 3.

The annular member 21 is displaced in height with respect to the ring 1 and the annular member 22 is displaced in height with respect to the ring 2, the height displacement of the annular members 21 and 22 with respect to the respective rings 1 and 2 being equal in value to the difference in level between the inner ring 1 and outer ring 2.

The width of the annular members 21 and 22 is such that, when the gasket is clamped between the coupling flanges 11, said members do not come into contact with or bear on the shoulders 13 and 15 in order to prevent any harmful marking on the coupling flanges 11.

Figure 5:
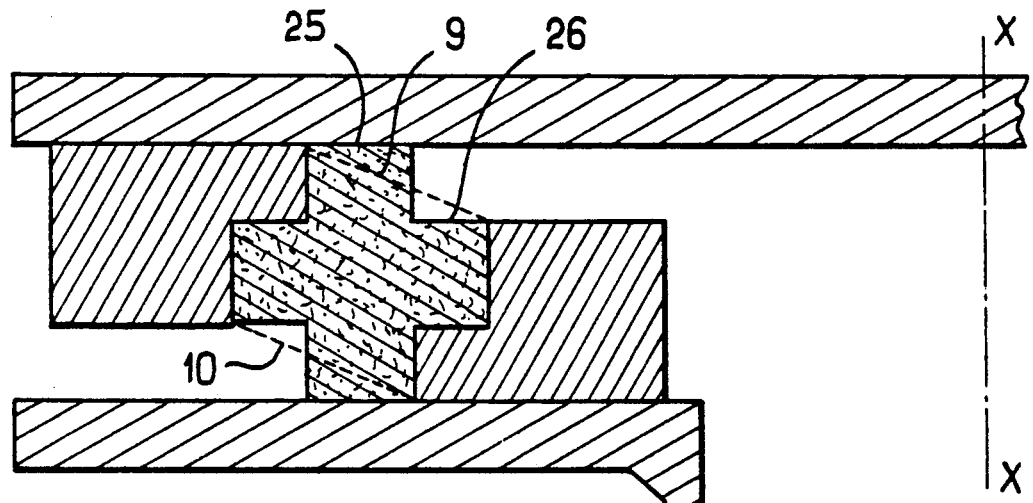
FIG. 5 is a part-sectional view of another embodiment of the invention, prior to clamping of the gasket.

In another embodiment of the invention which is illustrated in FIG. 5, the virtual top faces 9 and 10 of the expanded-graphite packing 3 which are shown in dashed lines in the figure have the shape of stair-steps 25, 26 but are so arranged that the angle of slope of said virtual faces 9 and 10 is smaller than or equal to the angle of repose.

Figure 6:
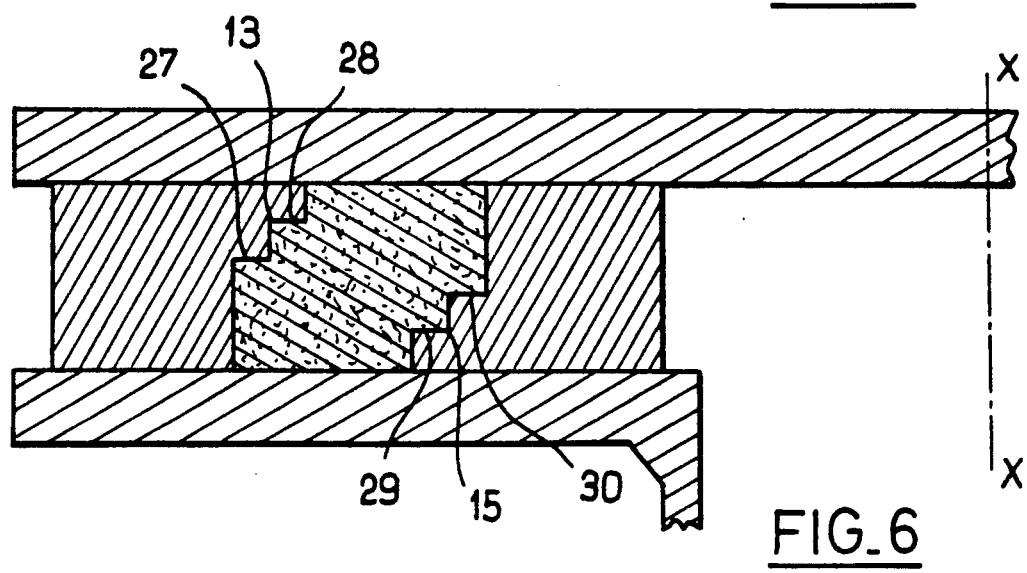
FIG. 6 is a part-sectional view of another embodiment of the invention, after clamping of the gasket.

In another embodiment of the invention which is illustrated in FIG. 6, the bearing zones 4, 5, 13 or 14 of the inner and outer rings 1 and 2 are each constituted by a series of shoulders such as two shoulders, for example, one pair of shoulders 27, 28 being formed on the upper portion of the outer ring 2 and the other pair 29, 30 being formed on the lower portion of the inner ring 1.

Figure 7:
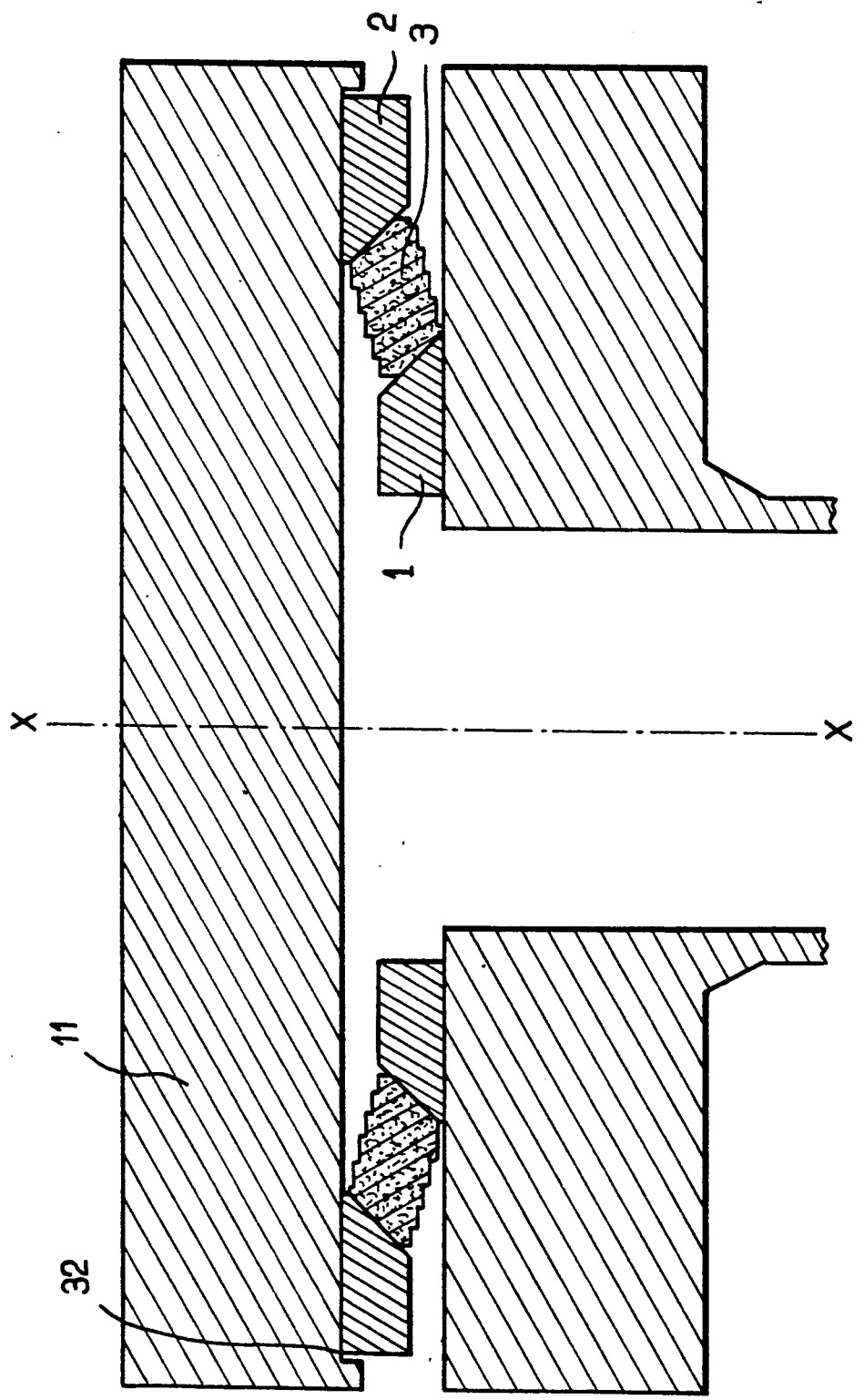
FIG. 7 is a part-sectional view of another embodiment of the invention, prior to clamping of the gasket.

In another embodiment of the invention shown in FIG. 7, at least one of the rings such as the outer ring 2, for example, is partially inserted in the corresponding flange 11 prior to initial clamping of the gasket. The recess 32 for preliminary engagement of the outer ring 2 within the corresponding flange 11 makes it possible to center the gasket with respect to the clamping means, to limit the expansion of the gasket under the internal pressure of the graphite and largely to eliminate any displacement or floating motion of the gasket.

Engagement of the inner ring 1 in the corresponding flange makes it possible not only to center the gasket with respect to the clamping means and to eliminate the greater part of any relative displacement of the gasket but also to limit contraction of the inner metallic ring so as to prevent local and random deformation of said inner ring 1.

The assembly consisting of sealing gasket and coupling flanges has an axis of symmetry which is the axis X—X. But when either the right or left half-section of the gasket is considered, it is observed that there is no axis of symmetry but only a center of symmetry 12 as shown in FIG. 1.

What is claimed is:

1. A sealing assembly for use between a pair of axially spaced compressing flanges comprising a seal ring of expanded graphite having an upper face, a lower face and lateral faces, and radially spaced inner and outer reinforcement rings having engagement surfaces engaging the lateral faces of the seal ring from above and below respectively, the inner and outer reinforcement rings each having parallel upper and lower faces for engaging the respective flanges, the upper face of the outer reinforcement ring being axially offset from the upper face of the inner reinforcement ring, the upper and lower faces of the seal ring each extending in a direction which defines with a respective one of the flanges, an angle of slope no greater than the natural angle of slope of the expanded graphite and the seal ring being radially confined between the engagement surfaces of the reinforcement rings.

2. An assembly as claimed in claim 1, wherein the upper and lower faces of the seal ring are curved.

3. An assembly as claimed in claim 1, wherein the upper and lower faces of the seal ring are linear.

4. An assembly as claimed in claim 1, wherein the upper and lower faces of the seal ring are stepped.

5. An assembly as claimed in claim 4, wherein the upper and lower faces of the seal ring each have multiple steps.

6. An assembly as claimed in claim 1, wherein the respective engagement surfaces of the reinforcement rings and the lateral faces of the seal ring have at least one interfitting step.

7. An assembly as claimed in claim 1, further including an inner annular member located between the seal ring and the inner reinforcement ring to engage one of said flanges and an outer annular member located between the seal ring and the outer reinforcement ring to engage the other of said flanges.

8. An assembly as claimed in claim 7, wherein the annular members are metallic.

* * * * *